United States Patent
Mine

(10) Patent No.: US 9,578,254 B2
(45) Date of Patent: Feb. 21, 2017

(54) IMAGE PICKUP APPARATUS CAPABLE OF REDUCING EFFECT OF FLICKER, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yosuke Mine, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/744,326

(22) Filed: Jun. 19, 2015

(65) Prior Publication Data

US 2015/0381873 A1    Dec. 31, 2015

(30) Foreign Application Priority Data

Jun. 27, 2014 (JP) ................................. 2014-132786

(51) Int. Cl.
*H04N 5/235* (2006.01)
*H04N 5/232* (2006.01)

(52) U.S. Cl.
CPC ........ *H04N 5/2357* (2013.01); *H04N 5/23219* (2013.01)

(58) Field of Classification Search
CPC ... H04N 5/2357; H04N 5/3532; H04N 5/2329

USPC .................................................... 348/226.1
See application file for complete search history.

(56) References Cited

U.S. PATENT DOCUMENTS

2007/0154202 A1*  7/2007  Lee ...................... H04N 5/2353
                                                              396/153
2011/0255786 A1*  10/2011  Hunter .................... H04N 5/21
                                                              382/190

FOREIGN PATENT DOCUMENTS

JP         2004-193922 A      7/2004

* cited by examiner

*Primary Examiner* — Nelson D. Hernández Hernández
(74) *Attorney, Agent, or Firm* — Fitzpatrick, Cella, Harper & Scinto

(57) ABSTRACT

An image pickup apparatus that is capable of photographing after performing a detection process for light-amount variation characteristics and an object recognition process without increasing processing time. An accumulation unit makes an image pickup device perform a plurality of times of charge storage and charge readout at a predetermined interval to obtain a plurality of images. A photometry unit performs photometry to the plurality of images to obtain a plurality of photometry values. A detection unit detects a light-amount variation characteristic of light from an object based on the plurality photometry values. A combining unit applies a combining process to the plurality of images to obtain an combined image. An object recognition unit applies an object recognition process to detect the object in the combined image.

12 Claims, 8 Drawing Sheets

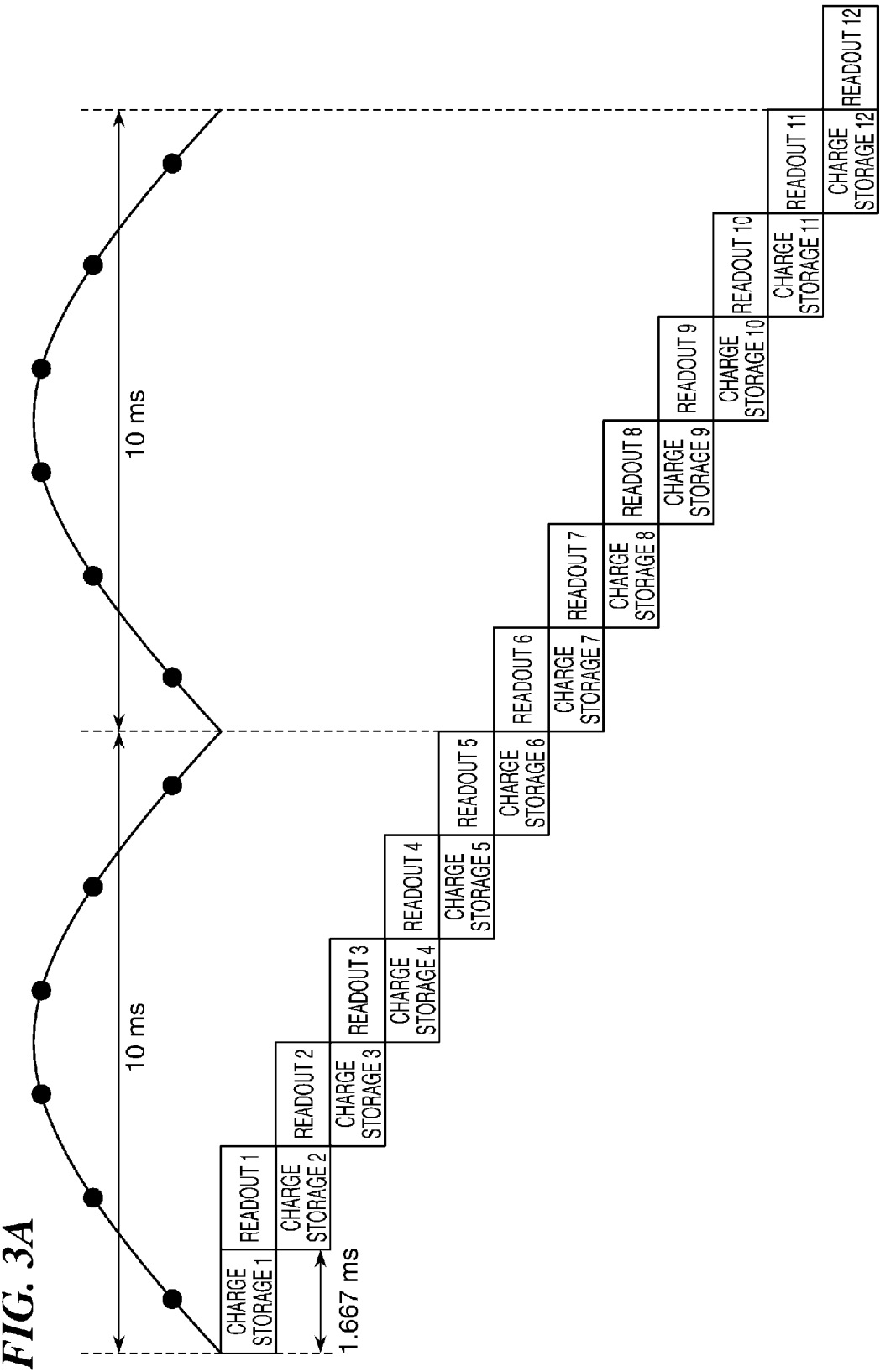

FIG. 7A

| MEMORY NAME | WRITTEN CONTENTS |
|---|---|
| MEMORY (0) | (IMAGE (0)) |
| MEMORY (1) | (IMAGE (0)) + (IMAGE (1)) |
| MEMORY (2) | (IMAGE (0)) + (IMAGE (1)) + (IMAGE (2)) |
| . | . |
| . | . |
| . | . |
| MEMORY (X) | |
| . | . |
| . | . |
| . | . |
| MEMORY (11) | |

FIG. 7B

| MEMORY NAME | WRITTEN CONTENTS |
|---|---|
| MEMORY (0) | (IMAGE (0)) |
| MEMORY (1) | (IMAGE (1)) |
| MEMORY (2) | (IMAGE (2)) |
| . | . |
| . | . |
| . | . |
| MEMORY (X) | (IMAGE (X)) |
| . | . |
| . | . |
| . | . |
| MEMORY (11) | (IMAGE (11)) |

IMAGE PICKUP APPARATUS CAPABLE OF REDUCING EFFECT OF FLICKER, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus, such as a digital still camera, a control method thereof, and a storage medium storing a control program therefor, and in particular, relates to a method for detecting flicker and reducing its effect when taking a picture under an artificial lighting.

Description of the Related Art

A recent image pickup apparatus, such as a digital still camera, performs an automatic exposure decision process (AE), an automatic white balance process (AWB), and a characteristic-color extracting process, and object recognition processes, such as a tracking process and a face recognition process.

Furthermore, since a sensitivity of an image pickup device of an image pickup apparatus becomes higher, an image without blur can be taken with a high-speed shutter even under a comparatively dark environment like an interior of a room. When a picture is taken in a room under fluorescent light that is spread as an indoor light source, a flicker phenomenon in which illumination light swings periodically at power supply frequency occurs.

The high-speed shutter photographing under such a flickering light source may vary a color temperature for every frame due to the effect of flicker. Furthermore, exposure unevenness and color unevenness may occur in one frame.

In order to reduce the effect of flicker, there is a known image pickup apparatus that detects flicker and controls exposure according to the detection result, for example (see Japanese Laid-Open Patent Publication (Kokai) No. 2004-193922 (JP 2004-193922A)). This image pickup apparatus reduces the effect of flicker by exposing at the peak position of the flicker where the variation of brightness is minimized according to the detection result of the flicker.

Incidentally, the above-mentioned publication does not disclose a technique for detecting flicker. There is a technique that detects a flicker cycle in response to transition of a photometry value for every charge storage by continuously storing with an image pickup device of which the charge storage cycle is different from an assumed flicker cycle.

However, if the flicker cycle is detected by the above-mentioned technique, charge has to be stored continuously. If an object recognition process and the charge storage process other than the detection of the flicker cycle are performed at the time of photographing, for example, processing load increases and processing time gets longer. Accordingly, a continuous photographing frame speed drops in a case where a user continuously takes pictures with the image pickup apparatus.

SUMMARY OF THE INVENTION

The present invention provides an image pickup apparatus, a control method therefor, and a storage medium storing a control program therefor, which are capable of photographing after performing a detection process for a light-amount variation characteristic and an object recognition process without increasing processing time.

Accordingly, a first aspect of the present invention provides an image pickup apparatus that includes an accumulation unit configured to make an image pickup device perform a plurality of times of charge storage and charge readout at a predetermined interval to obtain a plurality of images, a photometry unit configured to perform photometry to the plurality of images to obtain a plurality of photometry values, a detection unit configured to detect a light-amount variation characteristic of light from an object based on the plurality photometry values, a combining unit configured to apply a combining process to the plurality of images to obtain an combined image, and an object recognition unit configured to apply an object recognition process to detect the object in the combined image.

Accordingly, a second aspect of the present invention provides a control method for an image pickup apparatus that includes making an image pickup device perform a plurality of times of charge storage and charge readout at a predetermined interval to obtain a plurality of images, performing photometry to the plurality of images to obtain a plurality of photometry values, detecting a light-amount variation characteristic of light from an object based on the plurality photometry values, applying an combining process to the plurality of images to obtain an combined image, and applying an object recognition process to detect the object in the combined image.

Accordingly, a third aspect of the present invention provides a non-transitory computer-readable storage medium storing a control program causing a computer to execute the control method of the second aspect.

The present invention detects the light-amount variation characteristics of light from an object on the basis of a plurality of photometry values obtained by performing photometry for a plurality of images, and performs an object recognition process using an added image obtained by applying the addition process to the plurality of images. As a result of this, the light-amount variation characteristics can be detected and the object recognition can be performed without increasing processing time.

Further features of the present invention will become apparent from the following description of exemplary embodiments with reference to the attached drawings.

BRIEF DESCRIPTION OF THE DRAWINGS

FIG. 3A is a view showing an example of a relation between a charge storage control and photometry values in a flicker detection performed by the camera shown in FIG. 1 in a case where an amount of light from an object varies.

FIG. 7A is a view showing written contents in memory areas that saves added images generated by the camera according to the second embodiment of the present invention.

FIG. 7B is a view showing written contents in memory areas that save images generated by a camera according to a third embodiment of the present invention.

DESCRIPTION OF THE EMBODIMENTS

Hereafter, embodiments according to the present invention will be described in detail with reference to the drawings.

Figure 1:
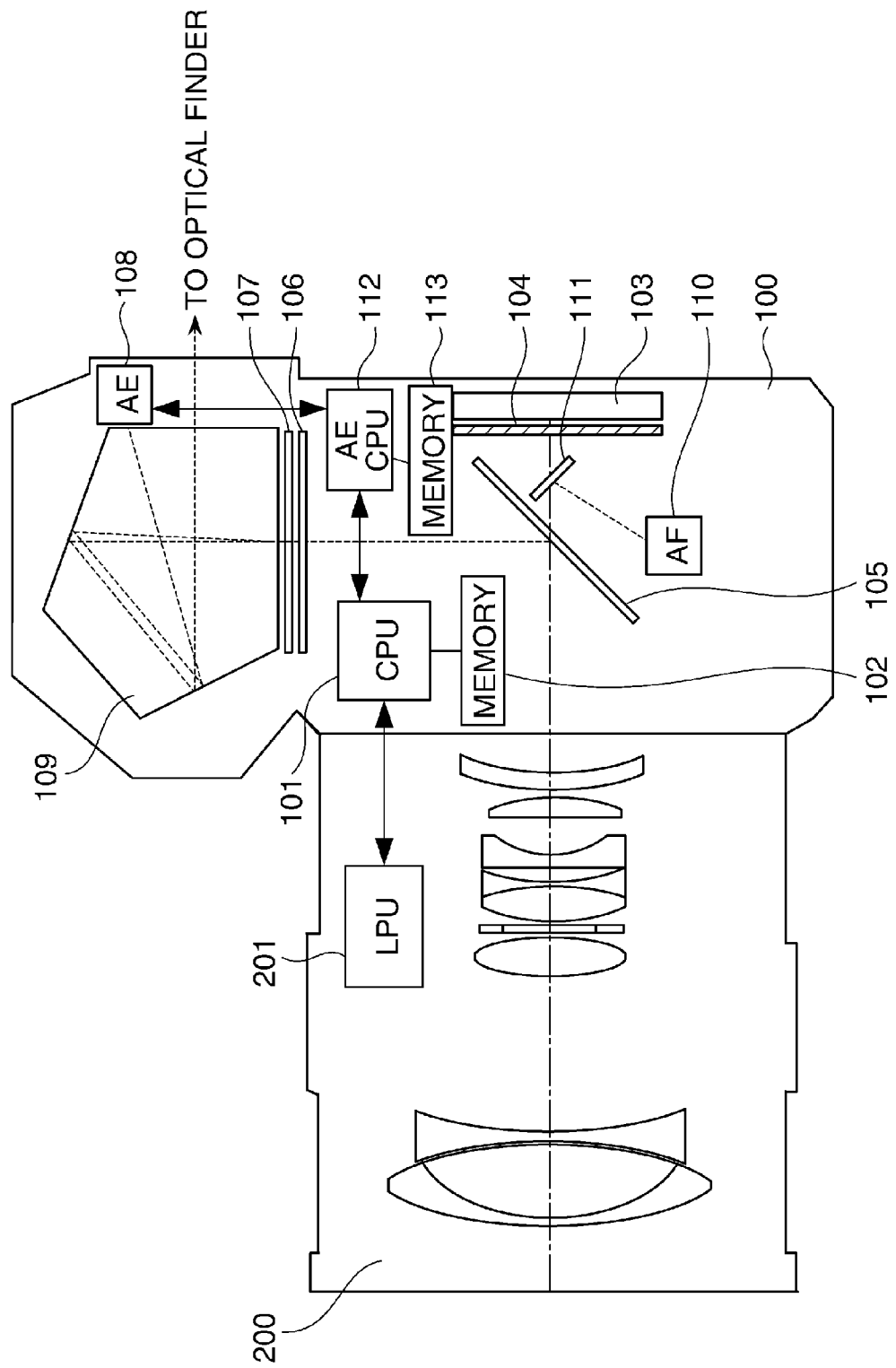
FIG. 1 is a view showing a configuration of an image pickup apparatus (camera) according to a first embodiment of the present invention.

FIG. 1 is a view showing a configuration of an image pickup apparatus according to a first embodiment of the present invention.

The image pickup apparatus shown in FIG. 1 is a digital single lens reflex camera (hereinafter referred to as a camera), for example, and has a camera body 100 and a photographing lens unit (hereinafter referred to as a photographing lens) 200. The camera body 100 is provided with a camera microcomputer (hereinafter referred to as a CPU) 101 that controls the whole camera. Moreover, the camera body 100 is provided with a release button (not shown) that is operated by a user. When the release button is pushed, a release switch SW2 that starts exposure turns ON.

A memory 102 is a RAM or a ROM, for example. The memory 102 stores programs that are executed by the CPU 101, and is used as a working area of the CPU 101. An image pickup device 103 is a CCD or CMOS image sensor, for example, and has an infrared ray cut filter, a low pass filter, etc.

A shutter 104 is arranged in front of the image pickup device 103. The shutter 104 shades the image pickup device 103 when not photographing. Then, the shutter 104 opens and an optical image (an object image) is formed on the image pickup device 103 through the photographing lens 200 at the time of photographing.

A half mirror 105 is arranged in front of the shutter 104. The half mirror 105 reflects a part of light that enters through the photographing lens 200 to form an image on a focusing screen 106 when not photographing. A display device 107 is arranged at the back side of the focusing screen 104.

The display device 107 is constituted by a PN liquid crystal. An auto focus (AF) detection frame, which indicates a target of the AF detection, is displayed on the display device 107. This enables a user who looks into an optical finder (not shown) to check a target position of the AF detection.

A pentagonal prism 109 guides the optical image formed on the focusing screen 106 to a photometry (AE) sensor 108 and the optical finder. The photometry sensor 108 is an image pickup device, such as a CCD or COMS image sensor, for example. This enables not only the photometry, but also face detection, object tracking, and detection (hereinafter referred to as flicker detection) of a characteristic of light-amount variation of light from an object caused by flicker phenomena that swings illumination light periodically at a power supply frequency.

Although the flicker is detected with the photometry sensor 108 in the following description, the flicker may be detected using an image obtained by the image pickup device 103.

An AF mirror 111 is arranged between the shutter 104 and the half mirror 105 on an optical axis. The AF mirror 111 guides the light that enters through the photographing lens 200 and passes through the half mirror 105 to a focus detection unit 110. The focus detection unit 110 is provided with an AF sensor and detects a defocus amount in response to an optical image formed by the light entered through the AF mirror 111.

An AE CPU 112 drivingly controls the photometry sensor 108 and performs a predetermined image process and a calculation about the image obtained from the photometry sensor 108. For example, the AE CPU 112 performs a face detection process, an object tracking process, a photometry process, and a flicker detection process with respect to an image obtained from the photometry sensor 108. A memory 113 is connected to the AE CPU 112. The memory 113 has a RAM and a ROM, for example.

Although the example shown in FIG. 1 has the AE CPU 112 for the photometry sensor 108, the CPU 101 may be perform processes performed by the AE CPU 112.

The photographing lens 200 is provided with a lens CPU (hereinafter referred to as an LPU) 201. The LPU 201 sends the focal length of the photographing lens 200, the positional information about a focus lens, etc. to the CPU 101.

Figure 2:
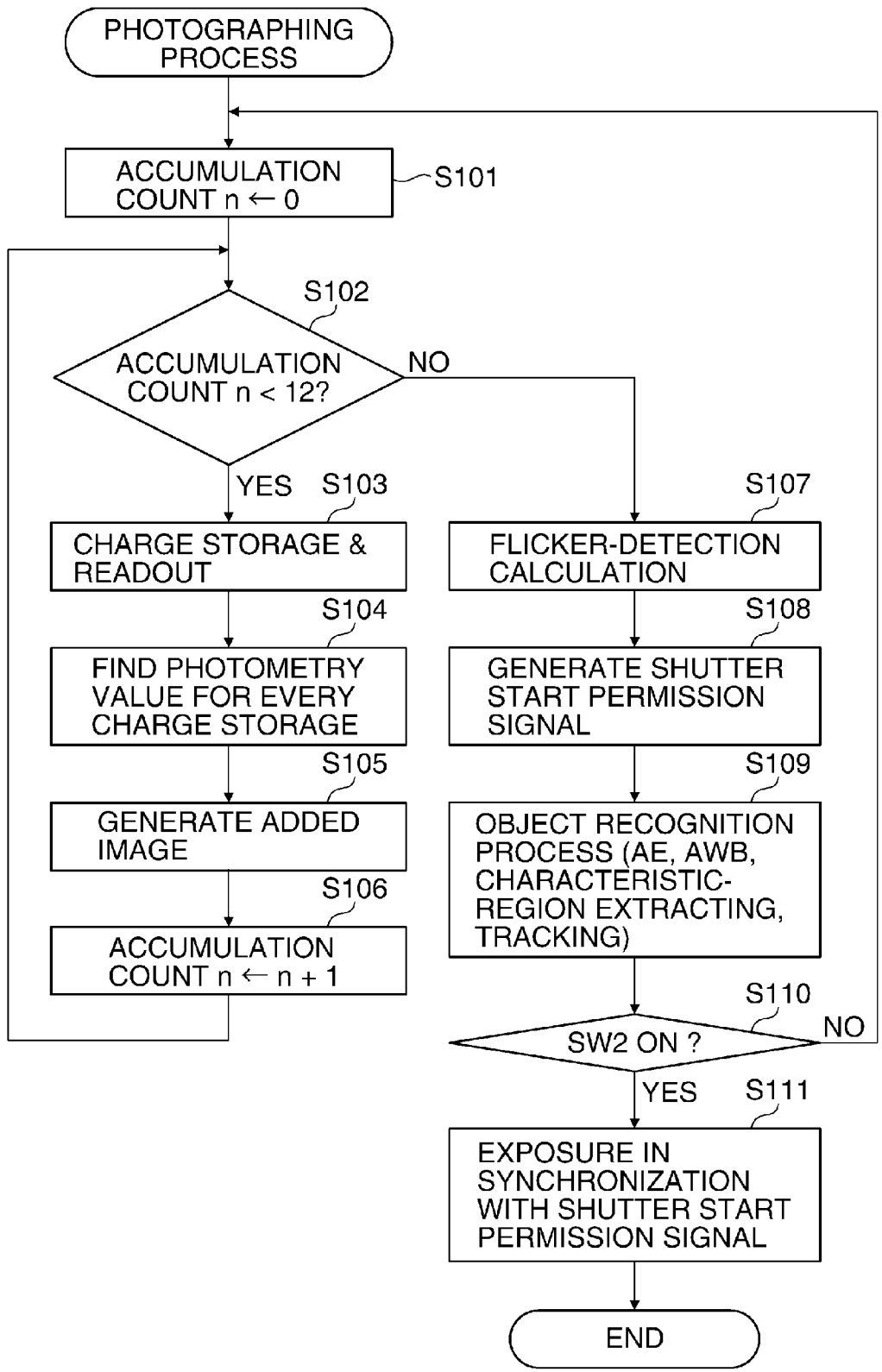
FIG. 2 is a flowchart showing a photographing process executed by the camera shown in FIG. 1.

FIG. 2 is a flowchart showing a photographing process executed by the camera shown in FIG. 1. It should be noted that the process of the illustrated flowchart is executed under the control by the CPU 101.

When the power of the camera is switched ON, the AE CPU 112 sets the number of times of charge storage (hereinafter referred to as an accumulation count n) to 0 times, and initializes images etc. that are saved in the memory 113 (step S101).

Next, the AE CPU 112 determines whether the accumulation count n is less than a predetermined count (for example, 12 times) (step S102). When the accumulation count n is less than 12 times (YES in the step S102), the AE CPU 112 controls the photometry sensor 108 to perform charge storage and charge readout (step S103).

It should be noted that a frequency of brightness variation caused by a flickering light source becomes twice as high as a commercial power frequency. Accordingly, when the commercial power frequency is 50 Hz, the frequency of the light amount variation of light from an object is 100 Hz. Moreover, when the commercial power frequency is 60 Hz, the frequency of the light amount variation of light from an object is 120 Hz. Accordingly, a frame rate for the flicker detection is set to a common multiple 600 fps of the frequencies (100 Hz and 120 Hz) of the flickering light sources predicted. Accordingly, 12 times of the charge storage and charge readout are continuously performed for every about 1.667 ms.

Next, the AE CPU 112 finds the photometry value for every charge storage according to the image data read from the photometry sensor 108 (step S104). In the following description, the n-th charge storage is referred to as "storage (n)", the n-th charge readout is referred to as "readout(n)", and the photometry value that is obtained by the readout(n) is referred to as "AE(n)". It should be noted that the photometry value AE(n) is an average of the brightness values of the whole image. The photometry values obtained by 12 times of the charge storage are stored in the memory 113.

The AE CPU 112 generates a combined image (an added image as follows (step S105). For example, the AE CPU 112 obtains added image data by adding image data obtained from the photometry sensor 108 and image data stored in the memory 113 for every pixel. Then, the AE CPU 112 writes (saves) the added image data in the memory 113 in the same address after the combining process (addition process).

It should be noted that the processes in the steps S104 and S105 are performed at the timing at which the process in the step S103 is performed.

Next, the AE CPU 112 adds 1 to the accumulation count n (step S106). Then, the AE CPU 112 returns the process to the step S102.

When the accumulation count n becomes 12 (NO in the step S102), i.e., when the process from the step S102 to the step S106 is repeated by 12 times, the AE CPU 112 performs a flicker-detection calculation according to the photometry values for 12 times of the storage that are found and stored in the memory 113 in the step S104 (step S107).

Figure 3B:
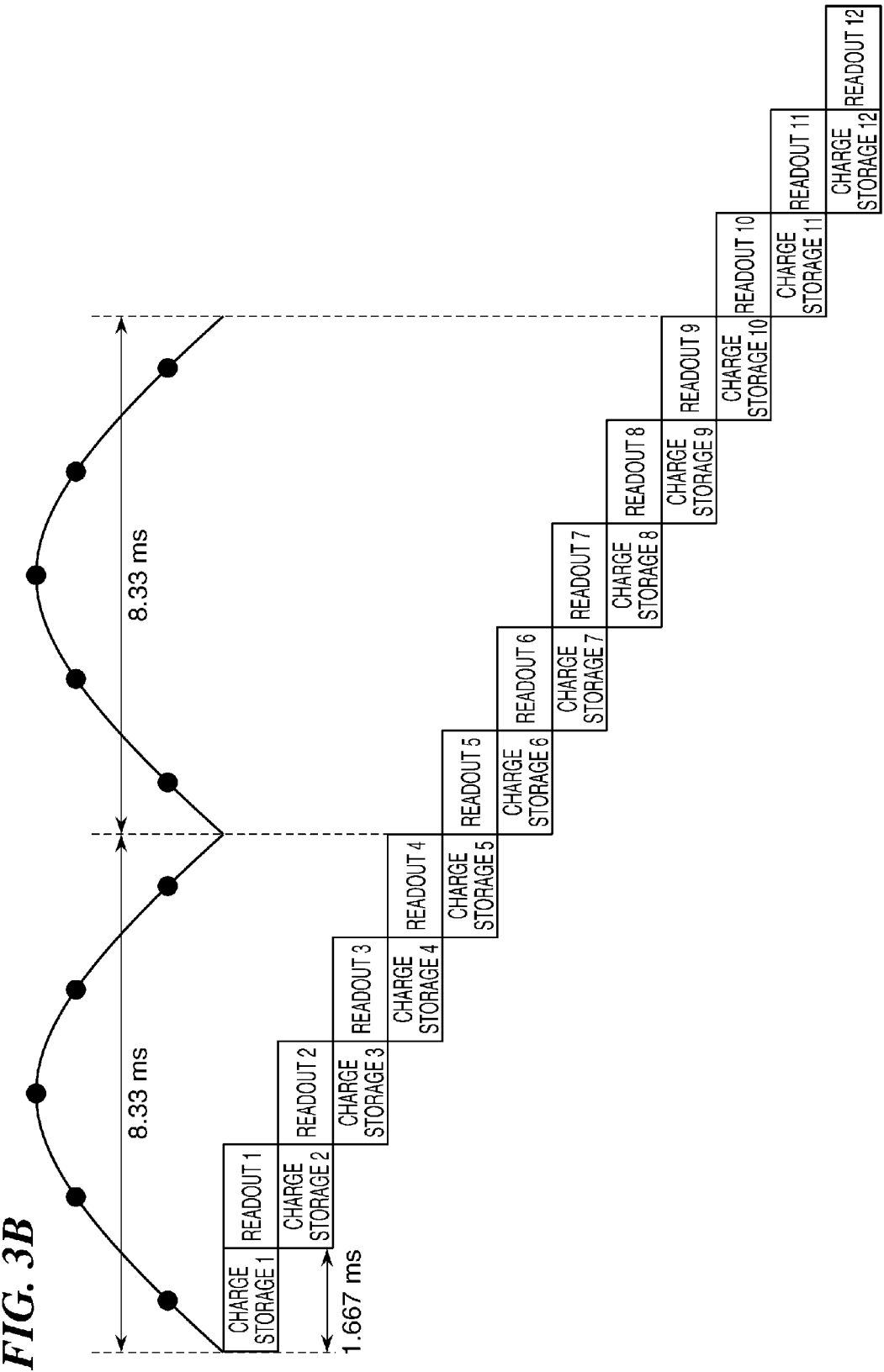
FIG. 3B is a view showing another example of the relation between the charge storage control and photometry values in the flicker detection performed by the camera shown in FIG. 1 in a case where an amount of light from an object varies.

FIG. 3A is a view showing an example of a relation between a charge storage control and photometry values in the flicker detection performed by the camera shown in FIG. 1 in a case where an amount of light from an object varies periodically. Moreover, FIG. 3B is a view showing another example of the relation between the charge storage control and photometry values in the flicker detection performed by the camera shown in FIG. 1 in a case where an amount of light from an object varies periodically.

FIG. 3A shows the charge storage control and the photometry values in a case where the commercial power frequency is 50 Hz. In the illustrated example, since the charge storage is performed with finite period, a photometry value is represented by a median of a storage period, and a timing at which AE(n) is obtained is referred to as "t(n)".

Here, since the light-amount variation cycle of the light from an object is about 10 ms, 6 times of the charge storage are performed (10/1.667≈6) during one cycle of the light-amount variation. Therefore, the same photometry value will be obtained every 6 times irrespective of the timing of the charge storage. That is, the relationship of AE(n)=AE(n+6) is held.

FIG. 3B shows the charge storage control and the photometry values in a case where the commercial power frequency is 60 Hz. Since the light-amount variation cycle of the light from an object in the case where the commercial power frequency is 60 Hz is about 8.33 ms, 5 times of the charge storage are performed (8.33/1.667≈5) during one cycle of the light-amount variation. Therefore, the same photometry value will be obtained every 5 times, and the relationship of AE(n)=AE(n+5) is held.

It should be noted that AE(n) is approximately constant irrespective of the accumulation count n under a photographing environment where an amount of light from an object does not vary periodically.

A flicker evaluation value (hereinafter referred to as an evaluation value) F50 in the case where the commercial power frequency is 50 Hz and an evaluation value F60 in the case where the commercial power frequency is 60 Hz are expressed by the following equations (1) and (2), respectively.

[Formula 1]

$$F50 = \sum_{i=1}^{6} |AE(n) - AE(n+6)| \quad (1)$$

$$F60 = \sum_{i=1}^{6} |AE(n) - AE(n+5)| \quad (2)$$

A predetermined flicker-detection threshold (hereinafter referred to as a threshold) is denoted as F_th. When conditions F50<F_th and F60<F_th are satisfied, it is determined that an amount of light from an object does not vary due to a flicker phenomenon (no flicker). Moreover, when conditions F50<F_th and F60≥F_th are satisfied, it is determined that an amount of light from an object varies due to a flicker phenomenon of which the luminescence cycle T is equal to 10 ms (the commercial power frequency 50 Hz) (i.e., flicker existing). That is, the light-amount variation cycle of the light from an object is calculated as 100 Hz.

Furthermore, when conditions F50≥F_th and F60<F_th are satisfied, it is determined that flicker of which the luminescence cycle T is equal to 8.33 ms (the commercial power frequency 60 Hz) exists. That is, the light-amount variation cycle of the light from an object is calculated as 120 Hz.

Incidentally, panning or a motion of an object may give a condition where both of the evaluation values F50 and F60 are not less than the threshold F_th. Accordingly, when the both of the evaluation values F50 and F60 are not less than the threshold F_th, the evaluation values F50 and F60 are compared. Then, when the evaluation value F50 is not more than the evaluation value F60, it is determines that the flicker of which the luminescence cycle T is equal to 10 ms (the commercial power frequency 50 Hz) exists.

On the other hand, when the evaluation value F50 is more than the evaluation value F60, it is determines that the flicker of which the luminescence cycle T is equal to 8.33 ms (the commercial power frequency 60 Hz) exists. Namely, when conditions F50≥F_th, F60≥F_th, and F50≤F60 are satisfied, it is determined that the flicker of which the luminescence cycle T is equal to 10 ms (the commercial power frequency 50 Hz) exists. Moreover, when a condition F50>F60 is satisfied, it is determined that the flicker of which the luminescence cycle T is equal to 8.33 ms (the commercial power frequency 60 Hz) exists.

When conditions F50≥F_th and F60≥F_th are satisfied, the flicker detection may be redone because of low reliability in the flicker detection result.

Referring to FIG. 2 again, when determining that the flicker exists in the step S107, the AE CPU 112 finds a phase of the light amount variation of the light from an object (hereinafter referred to as a flicker phase). When finding the flicker phase, the AE CPU 112 finds a peak timing at which the light amount of the light from an object becomes highest by interpolating the photometry values obtained by 12 times of the continuous charge storage and charge readout, for example.

Figure 4:
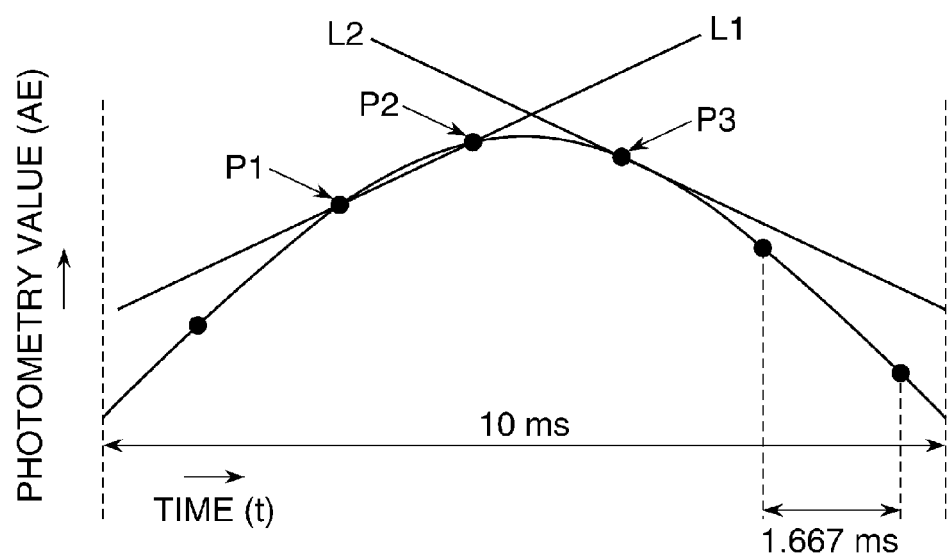
FIG. 4 is a graph showing a method for finding a peak timing of a light amount variation of a light from an object performed by the camera shown in FIG. 1.

FIG. 4 is a graph showing a method for finding a peak timing of a light amount variation of a light from an object performed by the camera shown in FIG. 1.

First, a point at which the maximum output (photometry value) is obtained is selected from among the photometry values AE(1) through AE(12), and the selected point is referred to as a point P2(t(m), AE(m)). Then, the previous point at which the photometry value is obtained adjacent to the point P2(t(m), AE(m)) concerned is referred to as a point P1(t(m−1), AE(m−1)). Moreover, the later point at which the photometry value is obtained adjacent to the point P2(t(m), AE(m)) is referred to as a point P3(t(m+1), AE(m+1)).

Then, a straight line L1 (AE=at+b) that passes the point P2 and one of the points P1 and P3 having smaller photometry value (the point P1 is used in the example shown in FIG. 4 because AE(m−1) is smaller than AE(m+1)) is found. Furthermore, a straight line L2 that passes the other of the points P1 and P3 having larger photometry value (the point P3 is used in the example shown in FIG. 4 because AE(m+1) is larger than AE(m−1)) and has inclination "−a" is found. Then, the intersection of the straight lines L1 and L2 shows the peak timing t(peak) of the light amount variation of the light from the object.

Although the peak timing of the light amount variation of the light from the object is found in the above-mentioned example, a timing at which the light amount of the light from the object becomes lowest (bottom timing) may be found. As mentioned above, the light-amount variation characteristic of the light from the object is calculated, and the light-amount variation cycle and the timing at which the light from the object satisfies a predetermined condition are found in the flicker detection process.

Next, the AE CPU 112 generates a shutter start permission signal on the basis of the light-amount variation cycle (hereinafter referred to as a flicker cycle) that was calculated by the process in the step S107 and the flicker phase (step S108). In this step, the AE CPU 112 outputs the shutter start permission signal at every timing of t=T(peak)+nT+α (n is a natural number) according to the flicker cycle T and the peak timing T(peak).

Figure 5:
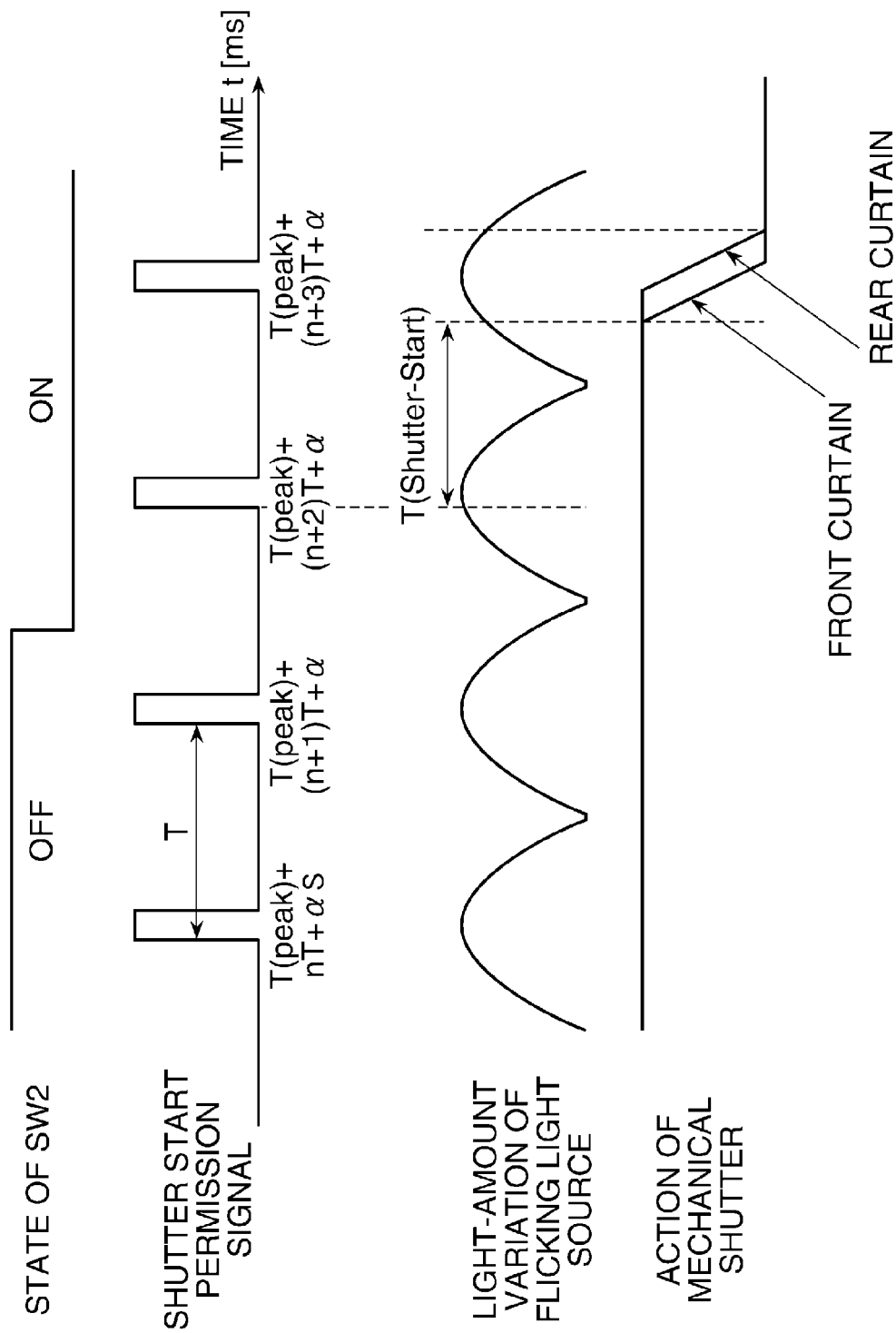
FIG. 5 is a timing chart showing a relation among a shutter start permission signal generated by the camera shown in FIG. 1, a light amount variation of a flickering light source, and an action of a mechanical shutter.

FIG. 5 is a timing chart showing a relation among the shutter start permission signal generated by the camera shown in FIG. 1, a light amount variation of a flickering light source, and an action of a mechanical shutter.

Incidentally, it takes time T(ShutterStart) to start travelling of the shutter 104 actually after the shutter start permission signal is output. Accordingly, it is preferable to measure the time T(ShutterStart) beforehand and to adjust the timing at which the shutter start permission signal is output so that the mechanical shutter travels during a period where the light amount variation of a flickering light source becomes lowest. The above-mentioned constant α is an adjustment value for that purpose.

It is ideally preferable to set the adjustment value a so that the peak timing at which the light amount variation becomes lowest comes to the center of the period from a timing at which a shutter front curtain starts travelling to a timing at which a shutter rear curtain finishes travelling.

Next, the AE CPU 112 performs a known object recognition process according to the added image obtained by 12 times of the charge storage in the step S105 (step S109). In this object recognition process, a photometry process (AE) for determining exposure by detecting a brightness of a field, a light-source determination process (AWB) for determining a light source that illuminates the field are performed.

Furthermore, in the object recognition process, a characteristic-color extracting process for extracting a characteristic color like a skin color, a tracking process for tracking an object with a method like a block matching, and a face recognition process for extracting a characteristic region like a face are performed. It should be noted that detailed descriptions about the above-mentioned processes in the object recognition process are omitted because they do not directly relate to the present invention.

In the object recognition process, the added image obtained by 12 times of the charge storage in the step S105 is used in order to obtain a stable image even under the flickering light source.

Luminance of the image obtained with the photometry sensor in the step S103 corresponding to the charge storage time of 1.667 ms varies under a flickering light source. Then, results of the light-source determination process, the characteristic-color extracting process, and the face recognition process may become unstable when the luminance of the image varies. Furthermore, if brightness of an object differs from each frame, accuracy of the block matching in the tracking process deteriorates.

On the other hand, if the charge storage time by the photometry sensor is an integer multiple of the light-amount variation cycle of the light from an object, the variation of luminance of an image due to the light amount variation under the flickering light source is suppressed, but the flicker detection cannot be performed in the step S107. If the charge storage time is the integer multiple of the light-amount variation cycle of the light from an object, the charge storage has to be performed in addition to the process in the steps S101 through S109, which increases the processing time inescapably.

As mentioned above, the added image is obtained by adding results of 12 times of the charge storage that are intermittently performed at the equal intervals of 1.667 ms during the total storage time of about 20 ms (in the case of the commercial power frequency 50 Hz) that is the integer multiple of the light-amount variation cycle of the light from the object. Use of this added image allows performing the object recognition process stably even under the flickering light source.

Moreover, when the object recognition process is performed using the added image obtained by 12 times of addition at the intervals of the charge storage time of 1.667 ms, a low brightness limit is improved, as compared with a case where the object recognition process is performed using a single image obtained in the charge storage time of 1.667 ms.

Referring to FIG. 2 again, the CPU 101 determines whether the user pressed the release button fully to turn the release switch SW2 ON (step S110). That is, the CPU 101 determines whether the shutter release start signal was inputted from the user. When the release switch SW2 is OFF (NO in the step S110), the CPU 101 returns the process to the step S101, and the AE CPU 112 initializes the accumulation count n.

On the other hand, when the release switch SW2 is ON (YES in the step S110), the CPU 101 drives the shutter 104 and drive the image pickup device 103 to expose in synchronization with the shutter start permission signal generated by the AE CPU 112 in the next timing (step S111). Then, the CPU 101 finishes the photographing process.

As mentioned above, the first embodiment of the present invention allows performing the object recognition process and the flicker detection process without complicating the calculation process. Furthermore, since the timing of exposure is controlled according to the light-amount variation cycle of the light from the object and the peak timing of the light amount that are obtained by the flicker detection process, a picture is taken stably.

Next, a camera according to the second embodiment of the present invention will be described. It should be noted that the configuration of the camera of the second embodiment is the same as the camera shown in FIG. 1.

In the above-mentioned first embodiment, the object recognition process is performed using the added image obtained by adding results of 12 times of the intermittent charge storage.

In this case, since the total storage time of 12 times of the charge storage is the integer multiple (twice) of the light-amount variation cycle under the flickering light source of which the light-amount variation cycle T is equal to 10 ms (the commercial power frequency 50 Hz), variation in the photometry sensor output is reduced. On the other hand, since the total storage time of 10 times of the charge storage is the integer multiple (twice) of the light-amount variation cycle under the flickering light source of which the light-amount variation cycle T is equal to 8.33 ms (the commercial power frequency 60 Hz), 12 times of the charge storage generate variation in the photometry sensor output due to the difference (2 times).

Furthermore, a pattern recognition used in a face recognition process etc. requires that the luminance of the added image in a face area falls within a predetermined range. In the first embodiment, since 12 times of the intermittent charge storage are always performed, the luminance of the added image may become too large to fall within the predetermined range.

The second embodiment enables performing the stable object recognition process under the flickering light sources of which the light-amount variation cycles T are equal to 10 ms and 8.33 ms so as to raise the accuracy of the pattern recognition processes, such as the face recognition process.

Figure 6:
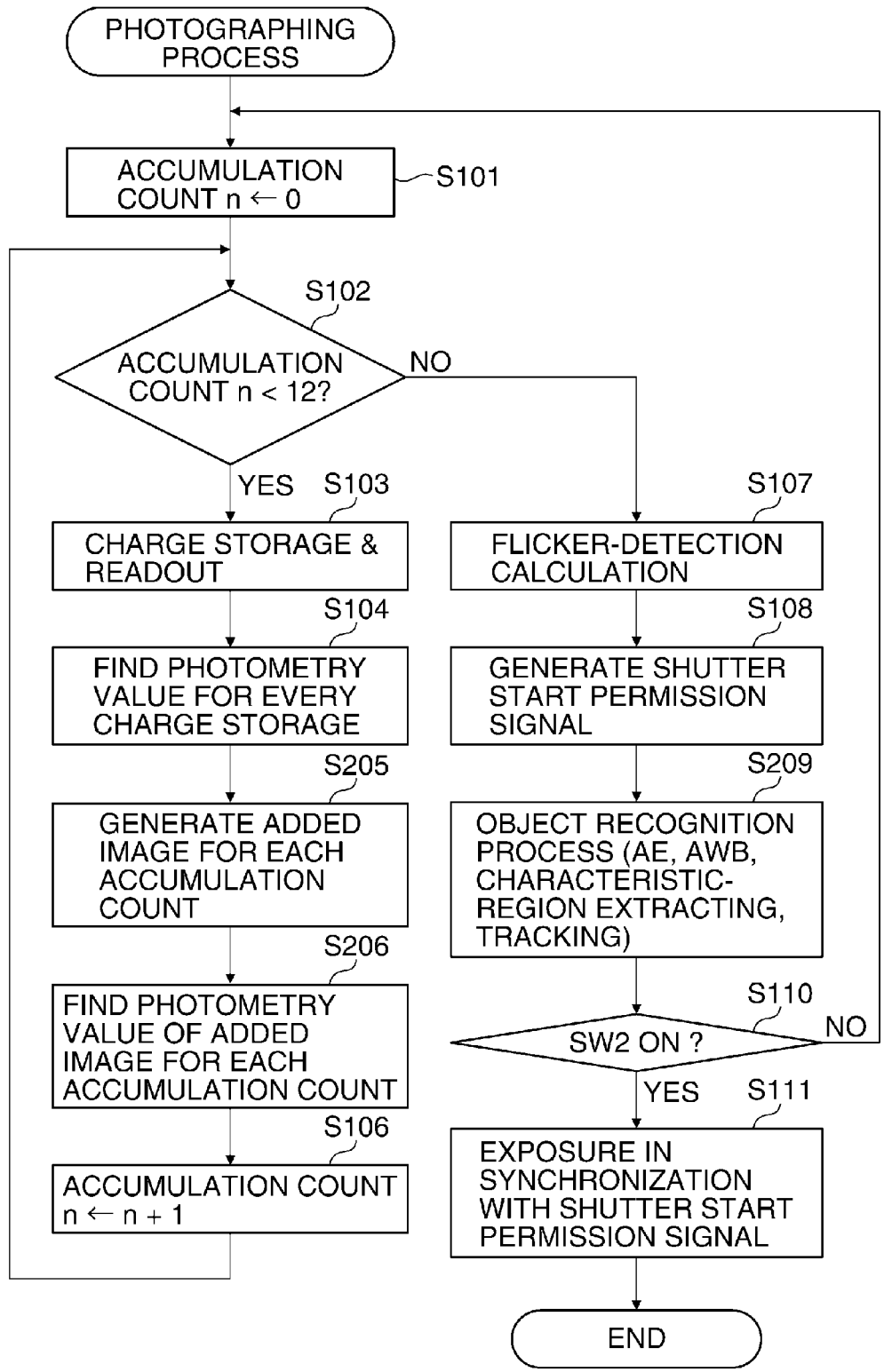
FIG. 6 is a flowchart showing a photographing process executed by a camera according to a second embodiment of the present invention.

FIG. 6 is a flowchart showing a photographing process executed by the camera according to the second embodiment of the present invention. It should be noted that steps in the flowchart in FIG. 6 that are the same as the steps in the flowchart in FIG. 2 are indicated by the same reference numerals, and their descriptions are omitted.

After finding the photometry value for each charge storage and storing it into the memory 113 in the step S104, the AE CPU 112 generates an added image and saves it into a memory for each accumulation count (step S205). As a result, a plurality of added images are obtained.

FIG. 7A is a view showing written contents in memory areas that saves added images generated by the camera according to the second embodiment of the present invention.

For example, the memory 113 secures memory areas in which twelve added images can be saved. Here, the first image is referred to as an image(0), and the (X+1)th image is referred to as an image(X). It should be noted that X is equal to n, and X is an integer among 0 through 11.

As shown in FIG. 7A, the AE CPU 112 first saves image data read from the photometry sensor 108 in the first readout (i.e., the accumulation count=1) into a memory(0) as an image(0) (a first added image).

Next, the AE CPU 112 obtains a second added image (image(0)+image(1)) by adding image data (image(1)) read from the photometry sensor 108 in the second readout and the image(0) read from the memory(0). Then, the AE CPU 112 saves the second added image into a memory(1).

Furthermore, the AE CPU 112 obtains a third added image (image(0)+image(1)+image(2)) by adding image data (image(2)) read from the photometry sensor 108 in the third readout and the second added image read from the memory (1). Then, the AE CPU 112 saves the third added image into a memory(2).

Similarly, the AE CPU 112 obtains a (X+1)th added image (image(0)+image(1)+ . . . +image(X)) by adding image data (image(X)) read from the photometry sensor 108 in the (X+1)th readout (the accumulation count=(X+1)) and the X-th added image read from the memory(X−1). Then, the AE CPU 112 saves the (X+1)th added image into a memory (X).

After obtaining the (X+1)th added image as mentioned above, the AE CPU 112 finds a photometry value of added image for each accumulation count. That is, the AE CPU 112 finds the photometry value (for example, the brightness value) of the (X+1)th added image (step S206). It should be noted that the average of the brightness values of pixels in the whole added image is found in this step. The processes in the steps S104, S205, and S206 are performed at the timing at which the process in the step S103 is performed.

After the process in the step S206, the AE CPU 112 proceeds with the process to the step S106. It should be noted that the saving of the added image into a memory area shown in FIG. 7A and the calculation of the photometry value are performed for each accumulation (i.e., images are added in order). That is, when the accumulation count is (X+1), the AE CPU 112 saves the (X+1)th added image into the memory(X) in the step S205, finds the accumulated photometry value of the (X+1)th added image concerned in the step S206, and proceeds with the process to the step S106.

On the other hand, when the accumulation count n becomes the predetermined count (for example, n=12) (NO in the step S102), the AE CPU 112 performs the flicker detection process in the step S107 as mentioned above according to the photometry values that were found and stored in the step S104, and generates a shutter start permission signal in the step S108.

Then, the AE CPU 112 performs the object recognition process according to the first to twelfth added images (i.e., the added images for all the accumulation counts), the photometry values for all the accumulation counts, and the light-amount variation cycle of the light from the object (step S209).

In the object recognition process, it is preferable not to generate the variation in the photometry sensor output for the photometry process (AE), the light-source determination process (AWB), the tracking process, the characteristic-color extracting process, and the face recognition process even under the flickering light source as mentioned above.

When it is determined that an object is under the flickering light source of which the light-amount variation cycle T is equal to 10 ms (the commercial power frequency 50 Hz) in the flicker detection process, the AE CPU 112 selects the added image obtained by 12 times of addition (the total accumulation time is 20.00 ms) or the added image obtained by 6 times of addition (the total accumulation time is 10.00 ms) and performs the object recognition process.

On the other hand, when it is determined that an object is under the flickering light source of which the light-amount variation cycle T is equal to 8.33 ms (the commercial power frequency 60 Hz), the AE CPU 112 selects the added image obtained by 10 times of addition (the total accumulation time is 16.67 ms) or the added image obtained by 5 times of addition (the total accumulation time is 8.33 ms) and performs the object recognition process.

Since the charge storage by the photometry sensor is performed in the cycle that is an integer multiple of the light-amount variation cycle of the light from the object according to the result of the flicker detection process in this way, the photometry sensor output is obtained stably even under the flickering light source.

Furthermore, when performing the pattern recognition, such as the face recognition process, the AE CPU 112 retrieves the accumulation count of the added image of which the brightness value falls within a predetermined range from among the brightness values of the added images for all the accumulation counts obtained in the step S206. Then, the AE CPU 112 reads the added image corresponding to the accumulation count concerned from the memory area, and performs the face recognition process.

When there are a plurality of accumulation counts of the added images of which the brightness values fall within the predetermined range, the AE CPU 112 may perform the face recognition process using one of them, and may perform the face recognition process at multiple times using a plurality of added images respectively.

After performing the process in the step S209, the CPU 101 performs the process in the step S110.

Next, a camera according to a third embodiment of the present invention will be described. It should be noted that the configuration of the camera of the third embodiment is the same as the camera shown in FIG. 1. FIG. 7B is a view showing written contents in memory areas that save images generated by the camera according to the third embodiment of the present invention. In the second embodiment, the added images are saved into from the memory(0) to the memory(11) in order as shown in FIG. 7A. On the other hand, in the third embodiment, images read from the photometry sensor 108 are saved into regions from the memory (0) to the memory(11) in order without adding the images.

In the third embodiment, the AE CPU 112 saves image data (image(X)) read from the photometry sensor 108 in the (X+1)th readout (i.e., the accumulation count=(X+1)) into a memory(X).

After finishing a predetermined times (for example, 12 times) of the charge storage and the charge readout, the AE CPU 112 reads the necessary number of images from the regions from the memory(0) to the memory(11), calculates a photometry value for each accumulation, generates an added image for each accumulation, and calculates a brightness value of an added image for each accumulation count. At this time, the charge storage with the photometry sensor is performed in a cycle that is an integer multiple of the light-amount variation cycle according to the result of the flicker detection process as with the second embodiment.

In this way, the second and third embodiments of the present invention give the effects that are similar to the effects of the first embodiment, and enables performing the stable object recognition process even under the flickering light source so as to raise the accuracy of the pattern recognition processes, such as the face recognition process.

Although the above-mentioned first, second, and third embodiments employ the image pickup device as the photometry sensor, the flicker may be detected according to a photometry result obtained using another photometry sensor.

The above-mentioned description clearly shows that the photometry sensor 108 and the AE CPU 112 function as the accumulation unit, and the AE CPU 112 functions as the photometry unit, the flicker detection unit, the addition unit, and the object recognition unit in the example shown in FIG. 1. Moreover, the CPU 101 and the AE CPU 112 function as the shutter control unit.

Although the embodiments of the invention have been described, the present invention is not limited to the above-mentioned embodiments, the present invention includes various modifications as long as the concept of the invention is not deviated.

For example, the functions of the above mentioned embodiments may be achieved as a control method that is executed by an image pickup apparatus. Moreover, the functions of the above mentioned embodiments may be achieved as a control program that is executed by a computer with which the image pickup apparatus is provided. It should be noted that the control program is recorded into a computer-readable storage medium, for example.

The above-mentioned control method and the control program have at least the accumulation step, the photometry step, the flicker detection step, the addition step, and the object recognition step.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-132786, filed Jun. 27, 2014, which is hereby incorporated by reference herein in its entirety.

What is claimed is:

1. An image pickup apparatus comprising:
   at least one processor or circuit configured to act as units comprising:
   (1) an accumulation unit configured to make an image pickup device perform a plurality of times of charge storage and charge readout at a predetermined interval to obtain a plurality of images;
   (2) a photometry unit configured to perform photometry to the plurality of images to obtain a plurality of photometry values;
   (3) a detection unit configured to detect a light-amount variation characteristic of light from an object based on the plurality of photometry values;
   (4) a combining unit configured to apply a combining process to the plurality of images to obtain a combined image; and
   (5) an object recognition unit configured to apply an object recognition process to detect the object in the combined image,
   wherein the accumulation unit makes the image pickup device perform the plurality of times of charge storage with a frequency higher than a predicted frequency of light-amount variation of light from the object.

2. The image pickup apparatus according to claim 1, wherein the predetermined interval is set according to a common multiple of predicted frequencies of light-amount variation of light from the object.

3. The image pickup apparatus according to claim 1, wherein the at least one processor or circuit is further configured to act as a shutter control unit configured to control a shutter according to the light-amount variation characteristic detected by said detection unit.

4. The image pickup apparatus according to claim 1, wherein said combining unit applies the combining process at plurality of times to the images in order to obtain a plurality of combined images, and
wherein said object recognition unit applies the object recognition process to each of the plurality of combined images.

5. The image pickup apparatus according to claim 1, wherein said combining unit obtains a plurality of combined images by applying the combining process at plurality of times to the images in order,
wherein said photometry unit performs photometry to the plurality of combined images to obtain a plurality of photometry values as accumulation photometry values,
wherein said detection unit detects the light-amount variation characteristic according to the accumulation photometry values, and
wherein said object recognition unit selects one of the plurality of combined images according to the light-amount variation characteristic detected by said detection unit, and applies the object recognition process to the selected combined image concerned.

6. The image pickup apparatus according to claim 1, wherein said detection unit detects a peak timing of the light amount of the light from the object.

7. The image pickup apparatus according to claim 1, wherein the accumulation unit makes an image pickup device perform the plurality of times of charge storage during one cycle of the predicted frequency of light-amount variation of light from the object.

8. The image pickup apparatus according to claim 1, wherein in each of the plurality of times of charge storage, the accumulation time is shorter than $1/120$ second.

9. The image pickup apparatus according to claim 1, wherein each of the plurality of photometry values is an average of the brightness values of the whole of each of the plurality of images.

10. The image pickup apparatus according to claim 1, wherein the at least one processor or circuit is at least one central processing unit.

11. A control method for an image pickup apparatus, the method comprising:
making an image pickup device perform a plurality of times of charge storage and charge readout at a predetermined interval to obtain a plurality of images;
performing photometry to the plurality of images to obtain a plurality of photometry values;
detecting a light-amount variation characteristic of light from an object based on the plurality of photometry values;
applying a combining process to the plurality of images to obtain an combined image; and
applying an object recognition process to detect the object in the combined image,
wherein the image pickup device is made to perform the plurality of times of charge storage with a frequency higher than a predicted frequency of light-amount variation of light from the object.

12. A non-transitory computer-readable storage medium storing a control program causing a computer to execute a control method for an image pickup apparatus, the control method comprising:
an accumulation step of making an image pickup device, which receives an object image, perform a plurality of times of charge storage and charge readout at a predetermined interval to obtain a plurality of images;
a photometry step of performing photometry to the plurality of images to obtain a plurality of photometry values;
a detection step of detecting a light-amount variation characteristic of light from an object based on the plurality of photometry values;
an combining step of applying a combining process to the plurality of images to obtain an combined image; and
an object recognition step of applying an object recognition process to detect the object in the combined image,
wherein the accumulation step makes the image pickup device perform the plurality of times of charge storage with a frequency higher than a predicted frequency of light-amount variation of light from the object.

* * * * *